United States Patent [19]
Donnelly et al.

[11] 3,735,340
[45] May 22, 1973

[54] STALL WARNING SYSTEM UTILIZING AN ELECTRONIC TIME DELAY

[75] Inventors: Thomas S. Donnelly, Willoughby; William C. Seidel, Chagrin Falls, both of Ohio

[73] Assignee: American Aviation Corporation, Cleveland, Ohio

[22] Filed: Apr. 10, 1970

[21] Appl. No.: 27,380

[52] U.S. Cl. ............................................. 340/27 SS
[51] Int. Cl. ............................................. B21o 45/00
[58] Field of Search ...................... 340/27 SS, 27 R, 340/26, 28; 244/77 D, 77 F; 317/141 S, 142 R, 148.5 B; 307/293

[56] References Cited
UNITED STATES PATENTS

| | | | |
|---|---|---|---|
| 3,343,043 | 9/1967 | Ito | 317/148.5 B |
| 3,457,464 | 7/1969 | Wallentowitz | 317/141 S |
| 3,098,953 | 7/1963 | Herr | 317/148.5 B |
| 3,274,452 | 9/1966 | Landes | 317/148.5 B |
| 3,189,751 | 6/1965 | Winchel | 317/148.5 B |
| 3,249,771 | 5/1966 | Pearse | 317/148.5 B |
| 3,327,972 | 6/1967 | Greene | 340/27 SS |

*Primary Examiner*—Kathleen H. Claffy
*Assistant Examiner*—Thomas D'Amico
*Attorney*—Fay, Sharpe and Mulholland

[57] ABSTRACT

A stall warning system for an aircraft including means for providing a signal indicating that the airflow at an airfoil on the aircraft is about at its stagnation point, means for providing a warning signal responsive to the condition sensed by the sensing means, and means for inhibiting the actuation of the warning means for a predetermined short period of time after the stall condition is sensed. In a preferred embodiment, the inhibiting means includes an electronic time delay circuit comprising a source of electrical potential, a transistor switch in circuit with the source of potential and wit the sensing means, and charge storage means in circuit with the transistor switch for storing a charge having a first magnitude when the transistor switch is non-conductive and a second magnitude when the transistor switch is conductive. The conductivity of the transistor switch is controlled by the sensing means. The storage of charge at the second magnitude by the charge storage means causes a controlled transistor to conduct at a predetermined time after the transistor switch becomes conductive. When the controlled transistor conducts, the coil of a relay is energized to actuate a contactor switch in circuit with the warning device. Thus, the actuation of the warning device is delayed for a predetermined short period of time to eliminate inadvertent operation due to the sensing of a gusting air condition by the sensing means.

12 Claims, 2 Drawing Figures

PATENTED MAY 22 1973

3,735,340

INVENTOR
THOMAS J. DONNELLY &
WILLIAM C. SEIDEL

BY *Fay, Sharpe + Mulholland*

ATTORNEYS

STALL WARNING SYSTEM UTILIZING AN ELECTRONIC TIME DELAY

BACKGROUND OF THE INVENTION

This invention relates to a stall warning system for an aircraft. More particularly, this invention relates to means for inhibiting the actuation of a warning device on an aircraft for a predetermined period of time after a sensing device indicates that the airflow at an airfoil on the aircraft is about at its stagnation point. Still more particularly, this invention relates to an electronic time delay circuit which effectively eliminates actuation of a warning device on the aircraft by various transient conditions caused, for example, by gusting air at the airfoil.

In general, virtually all aircraft incorporate a stall warning system to advise the pilot of the aircraft that the airflow at an airfoil of the aircraft is about at its stagnation point. The purpose of such a system is to provide the pilot with an advanced warning that the aircraft is approaching a stall attitude so that he may take appropriate corrective measures.

A typical stall warning system known to the art includes a stagnation sensor switch located, for example, at or near the leading edge of the wing of the aircraft. When the aircraft approaches a stalling attitude, the sensor switch will operate to activate a warning system on the aircraft. The warning device may provide an audible, a visual, or a vibratory signal, or a combination thereof, which thus advises the pilot of the in-flight condition of the aircraft.

It is a continuing problem with such systems, however, to eliminate false warnings caused by the spurious actuation of the sensor switch by transient air conditions. For example, a sensor switch may be actuated when a transient non-laminar airflow temporarily exists due, for example, to air gusting about the leading edge of the airfoil. The signals thus provided are both annoying and meaningless. On one hand, the pilot cannot afford to ignore the warning signals because of the possibility that they accurately represent the stall attitude of the aircraft. On the other hand, the provision of warning signals which do not accurately indicate the stall condition of the aircraft may cause unnecessary adjustments in the flight of the aircraft by the pilot and may consume an inordinate amount of the attention of the pilot at the expense of his attention to other duties in flying the aircraft.

An illustrative example of an airplane warning system is disclosed in the patent to L. M. Greene, U.S. Pat. No. 2,611,810, while examples of stall warning devices are disclosed in U.S. Pat. Nos. 2,611,810 and 2,716,228 to the same inventor.

Accordingly, it is an object of this invention to provide a stall warning system for an aircraft which eliminates spurious actuation of a warning device by extraneous signals detected by a stall warning switch due, for example, to gusting air.

It is another object of this invention to provide an electronic time delay circuit to actuate a stall warning device at a predetermined time after the receipt of a warning signal from a sensor switch on the aircraft.

It is a further object of this invention to provide an electronic time delay circuit for use in a stall warning system which immediately resets to its ready state when the warning signal from the sensor switch is terminated.

It is still another object of this invention to provide means for effectively eliminating spurious warning systems in the stall warning system of an aircraft caused by extraneous signals.

It is another object of this invention to provide a time delay circuit for an aircraft stall warning system which will reset when the sensor switch is deactivated and which will recycle at the predetermined time period independent of consecutively-received signals from the sensing device.

These and other objects of this invention will become apparent from a detailed review of the specification taken in conjunction with the accompanying drawings.

BRIEF SUMMARY OF THE INVENTION

Directed to achieving the objects stated and overcoming the aforementioned problems of the prior art, this invention relates to a stall warning system for an aircraft. The system includes the combination of means for sensing a change in the airflow at an airfoil of an aircraft at about the stagnation point and for providing a signal which indicates that state. Such sensing means, for example, may include a normally-open switch which is closed by the action of a sensing vane when the aircraft approaches a stall attitude. Warning means are responsive to a second signal which is, in turn, responsive to the signal generated by the sensing means. The warning means provide a warning signal which indicates that the condition sensed by the sensing means is present. The warning means, for example, include means for providing an audible, visual or vibratory signal or any combination thereof. According to the invention, means are provided for inhibiting the actuation of the warning means for a predetermined period of time after the sensing indication is provided from the sensing means. Thus, the inhibiting means prevents actuation of the warning means by spurious signals.

In a preferred embodiment, the inhibiting means comprise an electronic time delay circuit which includes a source of electrical potential which may be provided from the electrical system of the aircraft. A transistor switch is in circuit with the source of electrical potential and is normally biased to its non-conductive state. Charge storage means are in circuit with the transistor switch for storing charge at a first level when the switch is non-conductive and at a second level when the switch is conductive.

A controlled transistor has its anode-to-cathode current path in circuit with a coil of a relay. The gate of the controlled transistor is in circuit with the charge storage means so that when the charge is at its second level, the controlled rectifier becomes conductive by the discharge of the storage means from that level. Normally-open relay contactors are in circuit with the warning means and are responsive to the energization of the relay coil when the controlled transistor is conductive. A resistive discharge path is provided from the charge storage means so that the magnitude of the resistors in the discharge path thus controls the period of time delay of the circuit. It is an additional feature of the invention to provide a voltage doubling effect across the charge storage means by providing a diode in circuit with the source of potential and with the charge storage device. It is another significant feature of the invention that the circuit will automatically reset to its ready state whenever the sensor means is deactuated, such as during the time delay period.

DETAILED DESCRIPTION OF THE DRAWINGS

Figure 1:
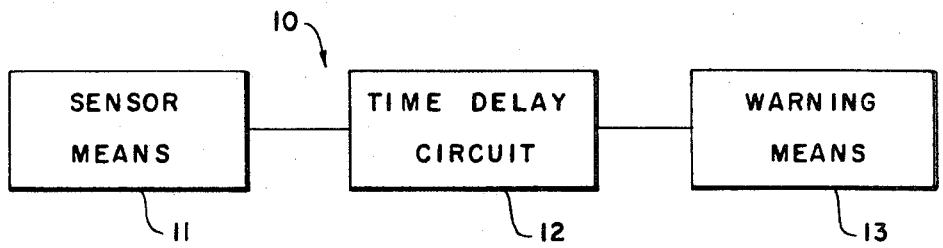
FIG. 1 is a block diagram of the components of the stall warning system according to the invention.

In FIG. 1, the stall warning system according to the invention is designated generally at 10 and comprises the combination of sensor means 11, a time delay circuit 12 and warning means 13.

The sensor means 11 sense a change in the air flow at an airfoil of the aircraft at about the stagnation point and provide a first signal which indicates that condition. The time delay circuit 12 receives the first signal from the sensor means 11 and provides a second signal responsive to the first signal at a predetermined later period of time to inhibit the actuation of the warning means 13 by spurious signals from the sensing means 11. The warning means 13 is responsive to the second signal provided by the time delay circuit 12 to provide a warning signal to the operator of the aircraft.

Figure 2:
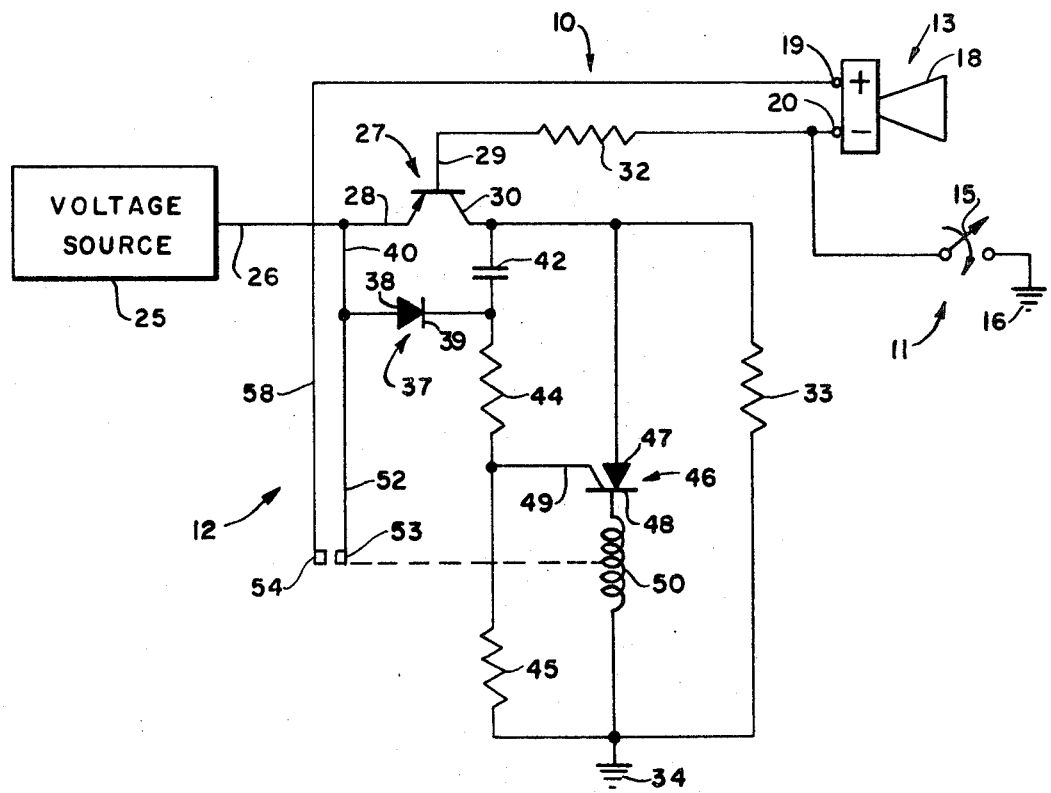
FIG. 2 is a detailed diagram of the preferred embodiment of the invention.

In FIG. 2, like reference numerals are used to indicate the components corresponding to those described in connection with FIG. 1. Thus, in the preferred embodiment, the sensor means 11 comprise a switch 15 having one of its terminals connected to a source of reference potential 16, for example, ground. Throughout this specification, the terms "source of reference potential" and "ground" are used interchangably.

The sensor switch 15 is a normally-open switch preferably located at or near the leading edge of an airfoil on the aircraft. The switch 15 effectively senses the change in the airflow about the stagnation point near the leading edge of the airfoil. When the airflow is at or about its stagnation point, thus indicating that the aircraft is at or near its stall attitude, the switch 15 closes to indicate that condition. Further examples of sensing devices which correspond in function and in operation to switch 15 are disclosed in the patents to L. M. Greene, U.S. Pat. Nos. 2,478,967, 2,611,810 and 2,716,228 previously mentioned. Those disclosures are herein incorporated by reference insofar as they relate to the positioning and operating of a typical stall warning system of the type here described.

The warning means 13 include an audible warning device 18 having a positive terminal 19 and a negative terminal 20. The application of an energizing potential between terminals 19 and 20 causes the device 18 to emit an audible signal which will apprise the pilot of the impending stall condition of the aircraft. Other types of warning means, such as visual indicators, vibratory systems or combinations thereof may also be used with the system of the invention.

The time delay circuit 12 includes a voltage source 25 which is obtained from the electrical system of the aircraft. Preferably, the voltage source provides a d-c signal having a magnitude suitable for use with the parameters of the time delay circuit 12. A rectified a-c signal may also be used.

The signal from the voltage source 25 is provided on lead 26 to the emitter 28 of the switching transistor 27. The base 29 of the transistor 27 is connected through a current-limiting resistor 32 to the negative terminal 20 of the warning device 18. The collector 30 of the transistor 27 is connected through a biasing resistor 33 preferably having a low resistance value, for example 2,000 ohms, to a source of reference potential 34. When switch 15 is open, the transistor 27 is biased to its non-conductive state.

The source of electrical potential provided on lead 26 is also applied to the anode 38 of the diode 37 by way of a lead 40. The cathode 39 of the diode 37 is connected to one terminal of a capacitor 42 which has its other terminal connected to the collector 30 of the transistor 27. The cathode 39 of the diode 37 is also connected to the series-connected resistors 44 and 45 which are in turn connected to the source of reference potential 34. Resistors 44 and 45 preferably have a high resistance value, for example 1 megohm and 3.3 megohms respectively, so that the capacitor 42 will charge to a first signal level, i.e., to the magnitude of the voltage source 25, by the conduction of the diode 37 in conjunction with the low resistance current path through the resistor 33.

A controlled transistor 46, for example, a silicon controlled rectifier, has its anode 47 in circuit with the collector 30 of the transistor 27 and one terminal of the capacitor 42. The cathode 48 of the controlled transistor 46 is connected to a coil 50 which is also connected to the source of reference potential 34. The gate 49 of the controlled transistor 46 is connected to the common junction between resistors 44 and 45 to control the conduction of the controlled transistor 46.

As previously indicated, the capacitor 42 has charged to the magnitude of the voltage source 25 through the resistor 33. When the switch 15 is closed because of the action of the airflow on the airfoil, the base 29 of the transistor 27 is connected to ground 16 through the resistor 32. When this condition occurs, the transistor 27 conducts to permit a current flow in its emitter-collecter current path. When the transistor 27 conducts, the capacitor 42 effectively stores a second signal level which is greater in magnitude than the first level.

When the capacitor 42 discharges from its second, higher signal level through resistors 44 and 45, sufficient current will flow after about one time constant determined by the capacitance of the capacitor 42 and the resistance value of resistors 44, 45 and 33 to cause the controlled transistor 46 to conduct. The controlled transistor 46 is triggered by the potential at its gate 49 so that current will flow in the current path defined by its anode 47 and its cathode 48, to energize the relay 50.

When relay 50 is energized, the relay contactors 53 and 54 associated therewith are closed so that a current path is completed which includes the voltage source 25, lead 26, lead 40, lead 52, contactors 53 and 54, and lead 58 to the positive terminal 19 of the warning device 18. As previously indicated, when the switch 15 is closed the negative terminal is set at a ground potential. Thus, since the positive terminal 19 is about at the potential of the voltage source 25, the warning device is activated.

The resistor 45 is selected to have a value so that the time for actuation of the controlled transistor 46 is about 0.9 seconds plus or minus 0.1 second after the switch 15 is closed. By decreasing the value of resistor 45, the time for actuation is similarly decreased.

It is an additional feature of the invention that the time delay circuit will reset to its ready state in the event that the switch 15 is opened during the time delay period. For example, if the switch closes, but reopens after about 0.5 seconds, the current through resistors 44 and 45 is not yet sufficient to actuate the controlled transistor 46. Thus, when switch 15 opens, the transistor 27 again becomes non-conductive and the potential across the capacitor 42 is controlled by the diode 37 and the operation of the circuit proceeds as previously described. This feature provides the significant added advantage that consecutively-received signals of a duration less than the time for the circuit to operate will not actuate the warning device 18.

It is an additional feature of the invention that the intrinsic stand-off ratio obtained by resistors 44 and 45 provides a stable voltage and temperature platform which permits operation of the circuit for an applied voltage of about 11 to 16 volts at temperatures ranging from about −20° C. to about 65° C.

For completeness of the disclosure, the following table lists suitable components for an operative embodiment.

| Circuit Element & Number | Value |
| --- | --- |
| Voltage source 25 | about 10-16 volts |
| Transistor 27 | 2N5354 |
| Resistor 32 | 2K ohms |
| Resistor 33 | 2K ohms |
| Diode 37 | 1N4154 |
| Capacitor 42 | 0.5 µf |
| Resistor 44 | 1 megohm |
| Resistor 45 | 3.3 megohms |
| Controlled transistor 46 | D13T1 |
| Relay 50 and contactors 53 & 54 | a relay commercially available bearing the designation OF-1A-12, available from Phipps, or its equivalent. |

The invention may be embodied in other specific forms without departing from the spirit or essential characteristics thereof. The present embodiments are therefor to be considered in all respects as illustrative and not restrictive. The scope of the invention is indicated by the appended claims rather than by the foregoing description, and all changes which come within the meaning and range of equivalents of the claims are therefor intended to be embraced therein.

What is claimed is:

1. An electronic time delay circuit in combination with a stall warning system for an aircraft of the type including an airfoil, the system comprising the combination of:
    means for sensing a change in the airflow at said airfoil about the stagnation point for said aircraft and for providing a first signal indicative thereof,
    warning means actuatable by a second signal responsive to said first signal for providing a warning signal indicating that the airflow at said airfoil is at about its stagnation point, and
    means for inhibiting the actuation of said warning means for a predetermined period of time after said sensing means provides said first signal to prevent actuation of said warning means by spurious signals from said sensing means, wherein said inhibiting means comprises said electronic time delay circuit operatively connected to said sensing means and said warning means for providing said second signal to said warning means at a predetermined time after said first signal is provided by said sensing means, and wherein said electronic time delay circuit comprises:
    a source of electrical potential,
    a first transistor in circuit with said source of electrical potential, said transistor being biased in a normally non-conductive state,
    first means for causing said first transistor to become conductive,
    charge storage means in circuit with said first transistor for receiving a signal when said first transistor is rendered conductive,
    controlled transistor means in circuit with said charge storage means, said controlled transistor means being biased in a normally non-conductive state, said controlled transistor means being connected in circuit with said source of electrical potential when said first transistor is rendered conductive by said first means, said controlled transistor means being rendered conductive when said storage means receives said signal, and
    output means in circuit with said controlled transistor means for providing said second signal when said controlled transistor means is rendered conductive.

2. The circuit as defined in claim 1 further including a relay comprising a coil and a pair of contactors, said coil being in circuit with said controlled transistor means, and said contactors being in circuit with said warning means and said source of reference potential, said contactors being normally in a first condition and being switched to a second condition to actuate said warning means when said controlled means is rendered conductive to energize said coil.

3. The circuit as defined define in claim 2 wherein said first switch means is a first transistor normally biased in a non-conducting state, said signal storage means is the capacitor for receiving a first signal when said first transistor is not conducting, and for receiving a second signal when said first transistor is conducting, and wherein said controlled transistor means is a controlled rectifier which is rendered conductive when said capacitor receives said second signal.

4. The circuit as defined in claim 3 further including a diode in circuit with said source of electrical potential and said capacitor to cause said capacitor to receive a first signal corresponding to said source of electrical potential when said first transistor is non-conductive.

5. A stall warning system for an aircraft of the type including an airfoil comprising the combination of:
    means for sensing a change in a airflow at said airfoil about the stagnation point for said aircraft and for providing a first signal indicative thereof,
    warning means actuatable by a second signal responsive to said first signal for providing a warning signal indicating that the airflow at said airfoil is at about its stagnation point, and
    means for inhibiting the actuation of said warning means for a predetermined period of time after said sensing means provides said first signal to prevent actuation of said warning means by spurious signals from said sensing means, wherein said inhibiting means comprises electronic means in circuit with said sensing means and said warning means for providing said second signal to said warning means at a predetermined time after said first signal is provided by said sensing means, and wherein said electronic means comprises:
    a source of electrical signals,
    first electronic switch means in circuit with said source of electrical signals and said sensing means, said first electronic switch means being biased to a non-conductive state and being rendered conductive by said first signal, means for storing a signal at a first level when said first electronic switch means is non-conductive and at a second level when said first electronic switch means is conductive, and controlled transistor means in circuit with said signal storage means for providing said second signal in response to the storage of a signal at a second signal level by said signal storage means.

6. The system as defined in claim 5 further including a relay comprising a coil and a pair of contactors, said coil being in circuit with said controlled transistor means, and said contactors being in circuit with said warning means and said source of reference potential, said contactors being normally in a first condition and being switched to a second condition to actuate said warning means when said controlled means is rendered conductive to energize said coil.

7. The system as defined in claim 6 wherein said first switch means is a first transistor normally biased in a non-conducting state, said signal storage means is the capacitor for receiving a first signal when said first transistor is not conducting, and for receiving a second signal when said first transistor is conducting, and wherein said controlled transistor means is a controlled rectifier which is rendered conductive when said capacitor receives said second signal.

8. The system as defined in claim 7 further including a diode in circuit with said source of electrical potential and said capacitor to cause said capacitor to receive a first signal corresponding to said source of electrical potential when said first transistor is non-conductive.

9. The circuit as defined in claim 1 further including unidirectional conducting means in circuit with said storage means and said source of reference potential so that the said storage means receives said first signal when said first transistor is non-conductive and receives said second signal when said first transistor is conducting.

10. The circuit as defined in claim 1 wherein said output means includes a relay coil in circuit with said controlled transistor means, said coil being energized when said controlled transistor means is rendered conductive, and contactors which are normally in a first condition of contact and which are caused to change to a second condition of contact when said coil is energized.

11. The circuit as defined in claim 9 further including a warning device in circuit with said contactors in such a manner that said warning device is actuated when said contactors are caused to change to said condition.

12. The circuit as defined in claim 10 wherein said first means is a switch.

* * * * *